United States Patent
Cromer et al.

(10) Patent No.: US 6,601,174 B1
(45) Date of Patent: Jul. 29, 2003

(54) DATA PROCESSING SYSTEM AND METHOD FOR PERMITTING A SERVER TO REMOTELY PROVIDE A CLIENT COMPUTER SYSTEM'S SETTINGS PASSWORD TO THE CLIENT

(75) Inventors: Daryl Carvis Cromer, Cary, NC (US); Richard Alan Dayan, Wake Forest, NC (US); Brandon Jon Ellison, Raleigh, NC (US); Eric Richard Kern, Durham, NC (US); Randall Scott Springfield, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/255,552

(22) Filed: Feb. 22, 1999

(51) Int. Cl.$^7$ .................. G06F 11/30; G06F 15/177; G06F 9/00
(52) U.S. Cl. .................. 713/202; 713/1; 713/2; 713/100
(58) Field of Search .................. 713/1, 2, 100, 713/200, 201, 202, 261; 709/224, 226, 229, 217, 219, 220

(56) References Cited

U.S. PATENT DOCUMENTS

| | | | | |
|---|---|---|---|---|
| 5,390,324 A | * | 2/1995 | Burckhartt et al. | |
| 5,504,905 A | * | 4/1996 | Cleary et al. | |
| 5,555,373 A | * | 9/1996 | Dayan et al. | |
| 5,892,906 A | * | 4/1999 | Chou et al. | |
| 6,065,081 A | * | 5/2000 | Stancil et al. | |
| 6,161,178 A | * | 12/2000 | Cromer et al. | |
| 6,216,226 B1 | * | 4/2001 | Agha et al. | |
| 6,223,284 B1 | * | 4/2001 | Novoa et al. | |

FOREIGN PATENT DOCUMENTS

EP  0588511 A2 * 3/1994

OTHER PUBLICATIONS

Microsoft Press Computer Dictionary, 1994, Micrsoft Press, p. 268.*

* cited by examiner

Primary Examiner—Gail Hayes
Assistant Examiner—Jenise Jackson
(74) Attorney, Agent, or Firm—Bracewell & Patterson, LLP

(57) ABSTRACT

A data processing system and method are described for permitting a server computer system to remotely provide a client computer system's settings password to the client computer system. The client and server computer systems are coupled together utilizing a network. A network settings password is established within the client. The network settings password is required prior to permitting access to system settings included within the client. The client receives the network settings password from the server computer system utilizing the network. Access to the system settings is permitted in response to the receipt of the network settings password. In this manner, the server computer system remotely provides a network settings password to the client computer system.

14 Claims, 5 Drawing Sheets

DATA PROCESSING SYSTEM AND METHOD FOR PERMITTING A SERVER TO REMOTELY PROVIDE A CLIENT COMPUTER SYSTEM'S SETTINGS PASSWORD TO THE CLIENT

BACKGROUND OF THE INVENTION

1. Field of the Invention

The present invention relates in general to data processing systems and, in particular, to a data processing system and method including a server and client computer systems coupled together utilizing a network. Still more particularly, the present invention relates to a data processing system and method including a server and client computer systems coupled together utilizing a network for permitting the server to provide a client computer system's settings password remotely to the client computer system.

2. Description of the Related Art

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as a mouse, and an optional network interface adapter. One of the distinguishing characteristics of these systems is the use of a motherboard or system planar to electrically connect these components together. Examples of such personal computer systems are IBM's PC 300 series, Aptiva series, and Intellistation series.

With personal computers being increasingly connected into networks to allow transfers of data among computers to occur, more operations such as maintenance, updating of applications, and data collections are occurring over the network. Computer networks are also becoming essential to their users. It is desirable to minimize loss of productivity by increasing availability of network resources. In today's networked world, the availability and performance of the network is as important as the availability and performance of the personal computer.

Passwords are known in the art to protect access to computer systems. A user is required to enter the correct password in order to utilize the computer system. It is also known in the art to require the correct entry of a settings password in order to access and/or change the computer system's settings. The system settings include configuration information, a boot sequence, and a listing of bootable devices. The settings password must also be entered in order to enter setup to clear an error condition which caused an unsuccessful boot. Without the settings password, a user may utilize the computer, but may not access or alter any system settings or the stored system configuration.

An error may occur during a boot of a computer system. For example, the keyboard may become unplugged which results in a failure to boot. In order to enter setup to clear the error resulting from the unplugged keyboard which caused the unsuccessful boot, a user must enter the correct settings password. The settings password is typically known only by a system administrator and not by ordinary computer users. Therefore, to correct or clear the error in the computer system, the system administrator must be physically present at the client computer system to enter the settings password, correct or clear the error, and restart the computer system.

Therefore, a need exists for a data processing system and method for permitting a server computer system to remotely provide a settings password to a client computer system.

SUMMARY OF THE INVENTION

A data processing system and method are described for permitting a server computer system to remotely provide a client computer system's settings password to the client computer system. The client and server computer systems are coupled together utilizing a network. A network settings password is established within the client. The network settings password is required prior to permitting access to system settings included within the client. The client receives the network settings password from the server computer system utilizing the network. Access to the system settings is permitted in response to the receipt of the network settings password. In this manner, the server computer system remotely provides a network settings password to the client computer system.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

FIG. 6 depicts a high level flow chart which illustrates a server computer system transmitting a network settings password to a client computer system in accordance with the method and system of the present invention.

DETAILED DESCRIPTION OF A PREFERRED EMBODIMENT

A preferred embodiment of the present invention and its advantages are better understood by referring to FIGS. 1–6 of the drawings, like numerals being used for like and corresponding parts of the accompanying drawings.

The present invention is a method and system for permitting a server computer system to remotely provide a network settings password to a client computer system. The network settings password is a network privileged access password (PAP). A privileged access password (PAP) must be provided to the client, either input manually utilizing the client's keyboard or received utilizing the network, prior to permitting access to the client's system settings. In response to the entry of a correct PAP, access is permitted to the system settings.

An initial copy of the network PAP is stored within the client computer system prior to regular operation of the client. Thereafter, in the event an error occurs during a boot of the client computer system, the client will prompt a user to enter the system PAP when the user attempts to enter setup, and will request a copy of the network PAP from the server. If the user correctly enters the system PAP, the user may access and change system settings as necessary, and may clear the error conditions which caused the boot process to fail.

The server will transmit a copy of the network PAP to the client. A network adapter included within the client will receive the copy of the network PAP and will compare the received copy with the stored initial network PAP. If the two match, a network PAP bit will be set. This bit is read by POST to determine whether a valid network PAP was received. If the bit is set, BIOS enters setup, clears the network PAP bit, and re-boots. If the bit is clear, BIOS will not enter setup.

The initial network PAP is stored within the client in protected storage which may not be read by software executing within the client. The storage location may not be read by POST or BIOS. The storage location may only be read by the network adapter included within the client.

A privileged access password is more fully described in U.S. Pat. No. 5,388,156. The invention described in U.S. Pat. No. 5,388,156 issued on Feb. 7, 1995 to Blackledge held in common ownership with this invention is hereby incorporated by reference.

Figure 1:
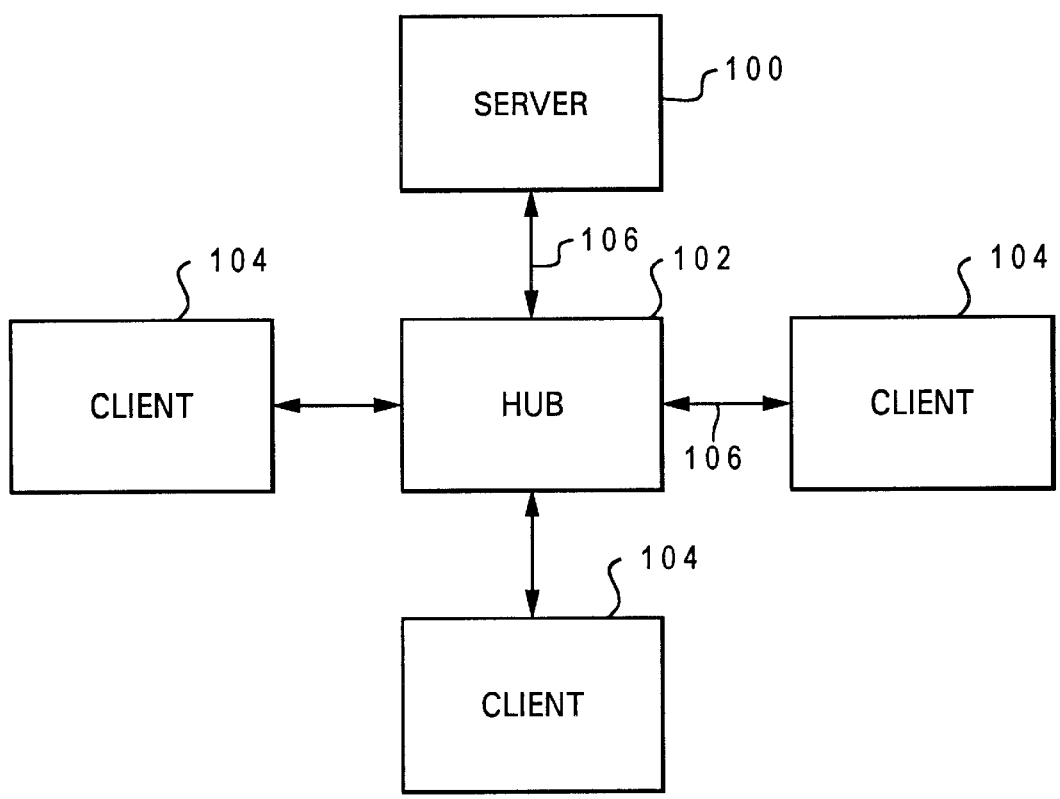
FIG. 1 illustrates a pictorial representation of a data processing system including a plurality of client computer systems coupled to a server computer system utilizing a network and a hub in accordance with the method and system of the present invention.

FIG. 1 illustrates a pictorial representation of a data processing system including a plurality of client computer systems 104 coupled to a server computer system 100 utilizing a hub 102 in accordance with the method and system of the present invention. Server computer system 100 is connected to a hub 102 utilizing a local area network (LAN) connector bus 106. Respective client systems 104 also connect to hub 102 through respective LAN busses 106. The preferred form of the network conforms to the Ethernet specification and uses such hubs. It will be appreciated, however, that other forms of networks may be utilized to implement the invention.

A "network" may include any type of data communications channel, such as an Ethernet network, token ring, X.10, or X.25. Those skilled in the art will recognize that the invention described herein may be implemented utilizing any type of data communications channel. However, the preferred embodiment is implemented utilizing an Ethernet network.

Figure 2:
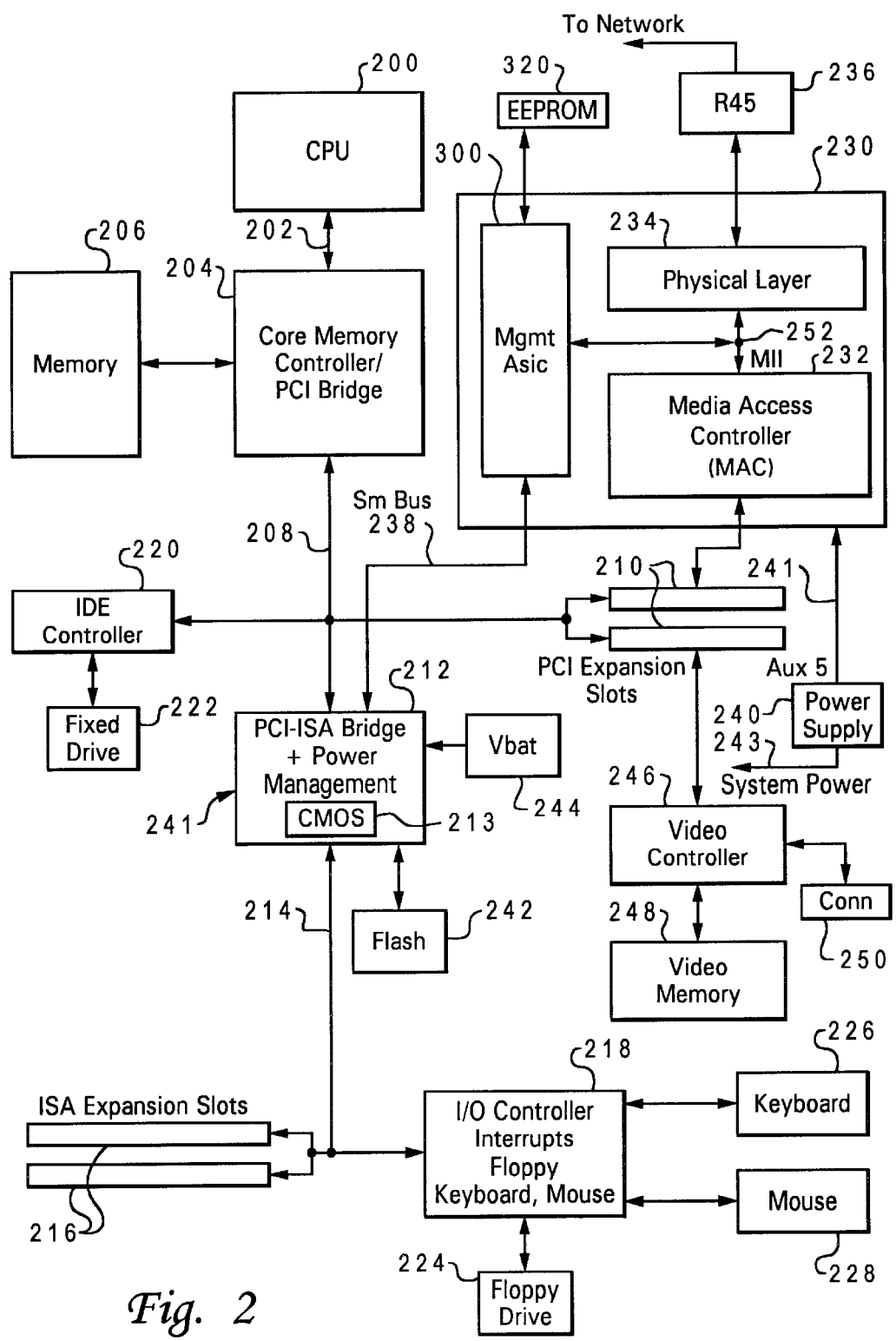
FIG. 2 depicts a pictorial representation of a processing and a network adapter included within a client computer system in accordance with the method and system of the present invention.

FIG. 2 illustrates a pictorial representation of a processor and a network adapter included within a client computer system in accordance with the method and system of the present invention. A central processing unit (CPU) 200 is connected by address, control, and data busses 202 to a memory controller and peripheral component interconnect (PCI) bus bridge 204 which is also coupled to system memory 206.

An integrated drive electronics (IDE) device controller 220 and a PCI bus to Industry Standard Architecture (ISA) bus bridge 212 are connected to PCI bus bridge 204 utilizing PCI bus 208. IDE controller 220 provides for the attachment of IDE compatible storage devices such as fixed disk drive 222. PCI/ISA bridge 212 provides an interface between PCI bus 208 and an optional feature or expansion bus such as the ISA bus 214. PCI/ISA bridge 212 includes power management logic. A PCI standard expansion bus with connector slots 210 is coupled to PCI bridge 204. PCI connector slots 210 may receive PCI bus compatible peripheral cards. An ISA standard expansion bus with connector slots 216 is connected to PCI/ISA bridge 212. ISA connector slots 216 may receive ISA compatible adapter cards (not shown). It will be appreciated that other expansion bus types may be used to permit expansion of the system with added devices. It should also be appreciated that two expansion busses are not required to implement the present invention.

PCI-ISA bridge controller 212 includes an interface for a flash memory 242, which includes microcode which client 104 executes upon power-on. Flash memory 242 is an electrically erasable programmable read only memory (EEPROM) module and includes BIOS that is used to interface between the I/O devices and operating system. PCI-ISA bridge controller 212 also includes CMOS storage 213 that holds initialization settings which represent system configuration data. Storage 213 includes values which describe the present configuration of client 104. For example, storage 213 includes information describing the list of initial program load (IPL) devices set by a user and the sequence to be used for a particular power method, the type of display, the amount of memory, time date, etc. Furthermore, this data is stored in storage 213 whenever a special configuration program, such as configuration/setup is executed. PCI-ISA bridge controller 212 is supplied power from battery 244 to prevent loss of configuration data in storage 213.

An I/O controller 218 is coupled to PCI-ISA bridge controller 212. I/O controller 218 controls communication between PCI-ISA bridge controller 212 and devices and peripherals such as floppy drive 224, keyboard 226, and mouse 228 so that these devices may communicate with CPU 200.

Client system 104 includes a video controller 246 which may, for example, be plugged into one of connector slots 210. Video controller 246 is connected to video memory 248. The image in video memory 248 is read by controller 246 and displayed on a monitor (not shown) which is connected to client 104 through connector 250.

A client system 104 includes a network adapter 230 which may, for example, be plugged into one of the PCI connector slots 210 (as illustrated) or one of the ISA connector slots 216 in order to permit client 104 to communicate with a LAN via connector 236 to hub 102.

Client computer system 104 includes a special power supply 240 which supplies full normal system power 243, and has an auxiliary power main AUX 5 241 which supplies full time auxiliary power to the power management logic 212 and to the network adapter 230. This enables client 104 to respond to a wakeup signal from network adapter 230. In response to a receipt of the wakeup signal, normal system power 243 from power supply 240 is turned on and then powers up client 104.

Network adapter 230 includes a physical layer 234 and a media access controller (MAC) 232 connected together utilizing a Media Independent Interface (MII) bus 252. The MII bus 252 is a specification of signals and protocols which define the interfacing of a 10/100 Mbps Ethernet Media Access Controller (MAC) 232 to the underlying physical layer 234.

MAC 232 processes digital network signals, and serves as an interface between a shared data path, i.e. the MII bus 252, and the PCI bus 208. MAC 232 performs a number of functions in the transmission and reception of data packets. For example, during the transmission of data, MAC 232 assembles the data to be transmitted into a packet with address and error detection fields. Conversely, during the reception of a packet, MAC 232 disassembles the packet and performs address checking and error detection. In addition, MAC 232 typically performs encoding/decoding of digital signals transmitted over the shared path and performs preamble generation/removal, as well as bit transmission/reception. In a preferred embodiment, MAC 232 is an Intel 82557 chip. However, those skilled in the art will recognize that the functional blocks depicted in network adapter 230 may be manufactured utilizing a single piece of silicon.

Physical layer 234 conditions analog signals to go out to the network via an R45 connector 236. Physical layer 234 may be a fully integrated device supporting 10 and 100 Mb/s CSMA/CD Ethernet applications. Physical layer 234 receives parallel data from the MII local bus 252 and converts it to serial data for transmission through connector 236 and over the network. Physical layer 234 is also responsible for wave shaping and provides analog voltages to the network. In a preferred embodiment, physical layer 234 is implemented utilizing an Integrated Services chip ICS-1890.

Physical layer 234 includes auto-negotiation logic that serves three primary purposes. First, it determines the capabilities of client computer 104. Second, it advertises its own capabilities to server computer 100. Third, it establishes a connection with server computer 100 using the highest performance connection technology.

Network adapter 230 includes a special purpose processing unit 300 coupled to the MII bus 252 between physical layer 234 and MAC 232. Logic module 300 may be a "hard wired" application specific integrated circuit (ASIC) or a programmed general-purpose processor which is programmed as more fully described below. By coupling ASIC 300 to the MII bus 252, ASIC 300 may send and receive network packets using physical layer 234.

Data from client computer system 104 is accessed by ASIC 300 over a system management bus (SM) 238. System management bus 238 is a two-wire low speed serial bus used to connect system management devices. This provides a path to allow software running on client 104 to access ASIC 300. With the trickle power supplied by signal AUX 5 241 from power supply 240, ASIC 300 is preferably powered full time.

Figure 3:
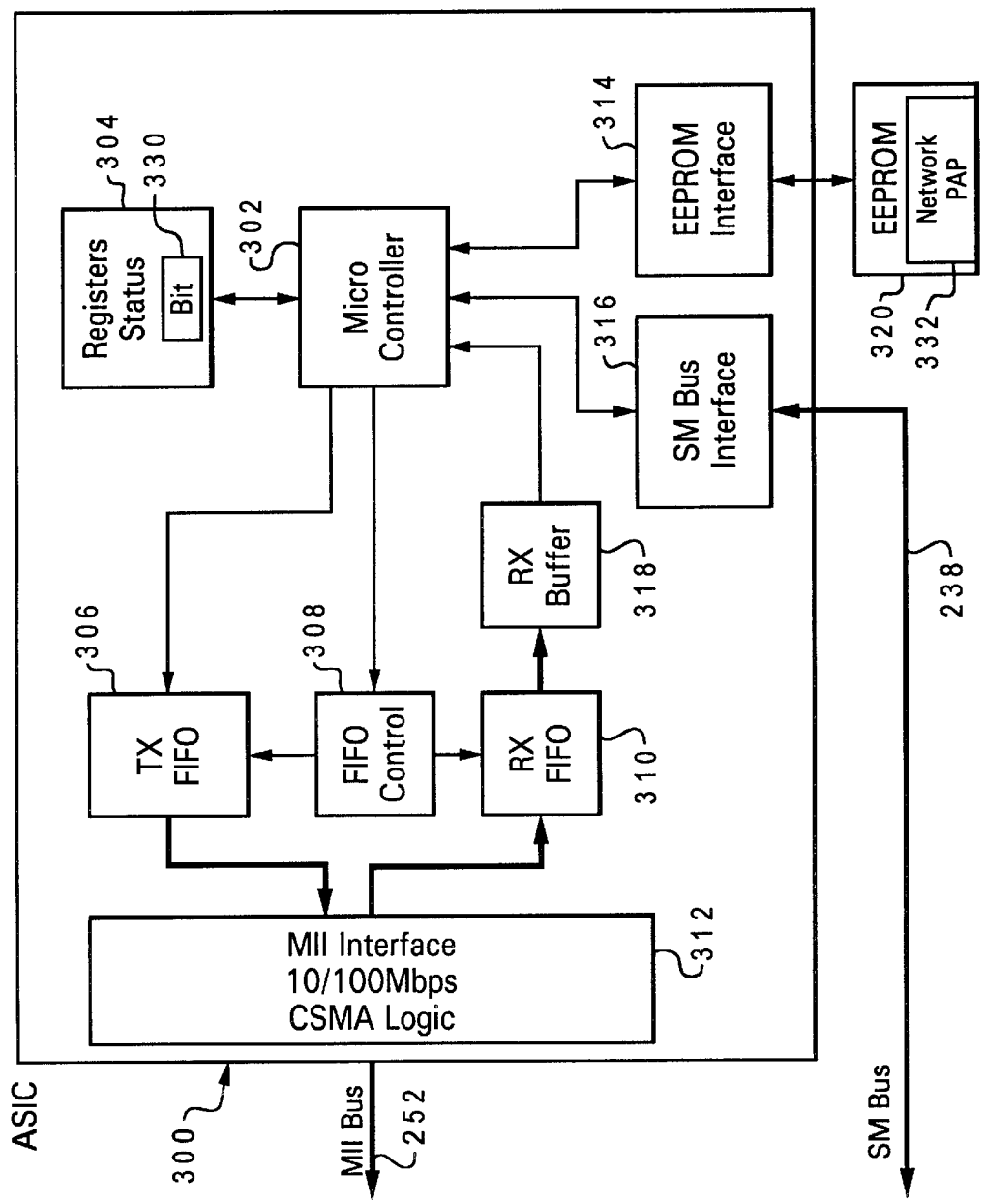
FIG. 3 illustrates a pictorial representation of a special purpose processing unit included within a network adapter in accordance with the method and system of the present invention.

FIG. 3 illustrates a pictorial representation of a special purpose processing unit included within network adapter 230 in accordance with the method and system of the present invention. Special purpose processing unit is implemented utilizing ASIC 300 which includes a micro-controller 302 which includes several state machines to handle the following tasks: packet reception, SM bus interface, and EEPROM updates. Micro-controller 302 sends commands to FIFO control 308 to control data flow from TX FIFO 306, RX FIFO 310, and RX Buffer 318. Micro-controller 302 also responds to SM bus requests through SM bus interface 316 from software running on client 104 to access register status 304. Signals are received from the MII bus 252 by interface unit 312 and passed to RX FIFO 310. Micro-controller 302 may access data stored in EEPROM 320 through EEPROM interface 314.

Register status 304 includes a network PAP bit 330. Network adapter 230 sets network PAP bit 330 in response to network adapter 230 receiving a network PAP which is the same as an initial network PAP stored in EEPROM 320 in network PAP storage 332. Network PAP bit 330 remains cleared if the received network PAP is not the same as the stored network PAP 332. Micro-controller 302 determines the source of a request to access the network PAP stored in EEPROM 330. If the request came from the network, micro-controller 302 is capable of reading and/or writing to storage 332. If the request came from SM bus 238, micro-controller 302 is not capable of reading or writing to storage 332.

Figure 4:
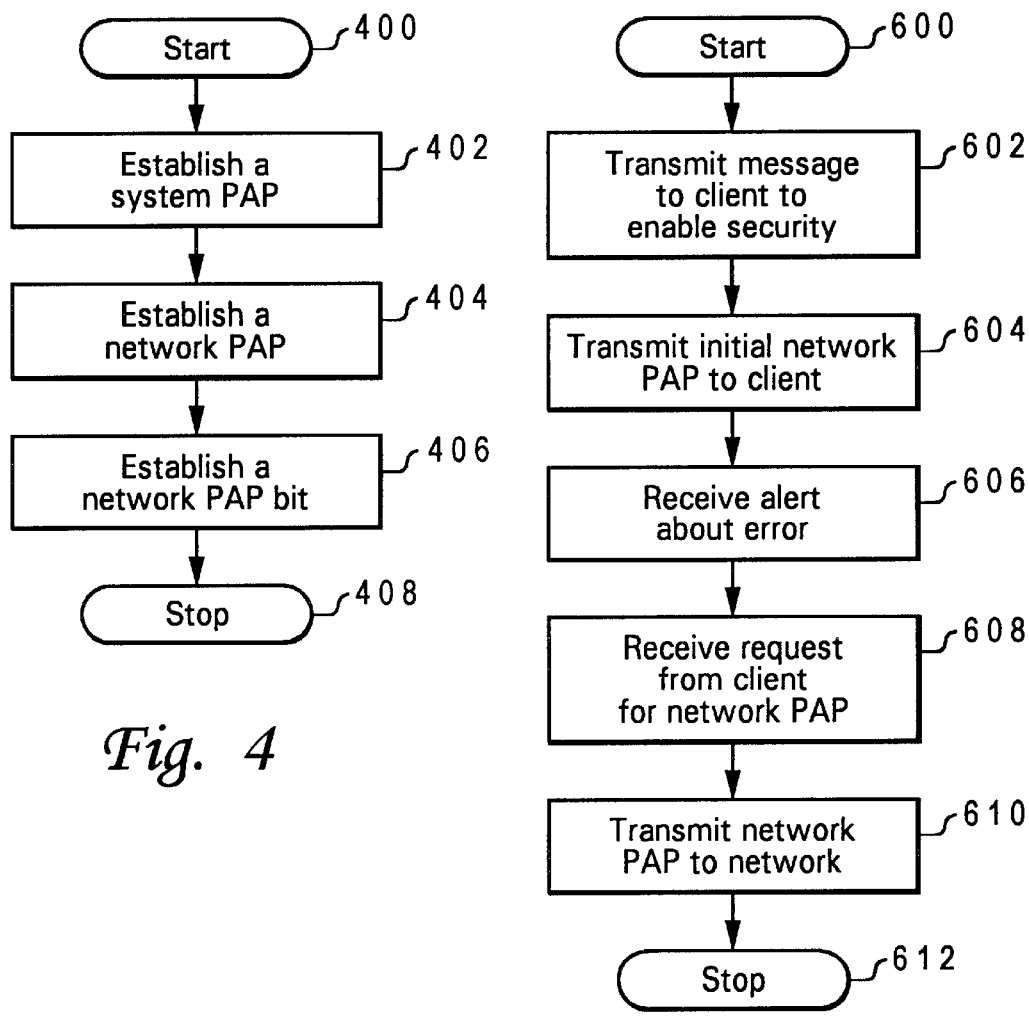
FIG. 4 depicts a high level flow chart which illustrates establishing passwords and a password bit within a client computer system in accordance with the method and system of the present invention.

FIG. 4 depicts a high level flow chart which illustrates establishing passwords and a password bit within a client computer system in accordance with the method and system of the present invention. The process starts as depicted by block 400 and thereafter passes to block 402 which illustrates establishing a system privileged access password (PAP). A privileged access password, either the system PAP or network PAP, is required when a user attempts to alter system settings or access restricted functions. The system PAP is input when a user is physically present at the client computer system. The network PAP is downloaded utilizing the network from server to a client.

Next, block 404 depicts establishing a network privileged access password (PAP). The network PAP is received by a client computer system from a server computer system. Users are not aware of the content of network PAP utilized by the client. In addition, software executing within the client, including POST and BIOS, is not aware of the content of network PAP. The network adapter 230 stores a copy of the correct network PAP in protected storage 332.

Thereafter, block 406 illustrates establishing a network PAP bit. The network PAP bit 330 is preferably implemented in registers status 304, but may be implemented in other components within client 104. Software executing within the client may access bit 330 to determine whether the client received a correct copy of the network PAP from the server. If a correct copy was received, bit 330 will be set. If an incorrect copy or no copy was received, bit 330 will remain cleared, or reset. The process then terminates as depicted at block 408.

Figure 5:
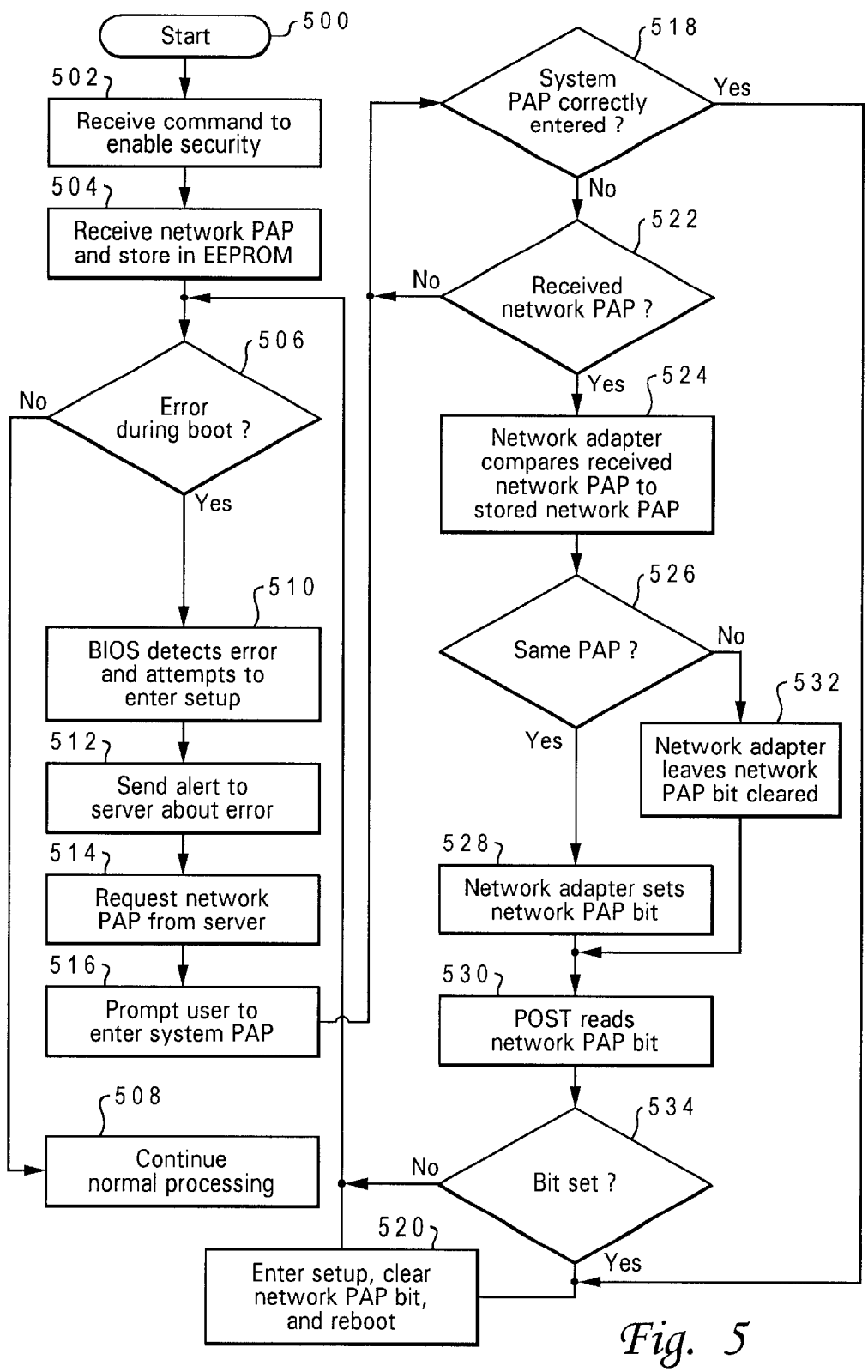
FIG. 5 depicts a high level flow chart which illustrates a client computer system receiving and utilizing a network settings password to boot in accordance with the method and system of the present invention.

FIG. 5 depicts a high level flow chart which illustrates a client computer system receiving and utilizing a network settings password to boot in accordance with the method and system of the present invention. The process starts as illustrated at block 500 and thereafter passes to block 502 which depicts the client receiving a command from the server to enable enhanced security within the client. When enhanced security is enabled, a privileged access password is required in order to access and change system settings. Next, block 504 depicts the client receiving an initial network PAP from the server. The initial network PAP is stored in location 332 within EEPROM 320. When the client requests a network PAP from the server, it will be compared with the initial network PAP stored in location 332.

Next, block 506 illustrates a determination of whether or not an error occurred during a boot of the client. If a determination is made that no error occurred, the process passes to block 508 which depicts the continuation of normal processing.

Referring again to block 506, if a determination is made that an error did occur during a boot of the client, the process passes to block 510 which illustrates BIOS executing within the client detecting the error and attempting to enter setup. This client is configured to require the entry of a correct PAP prior to entering setup.

The process then passes to block 512 which depicts the client sending an alert to the server about the error. Next, block 514 illustrates the client transmitting a message to the server requesting a copy of the network PAP. Thereafter, block 516 depicts the client prompting the user for the system PAP. Block 518, then, illustrates a determination of whether or not the system PAP was correctly entered. If a determination is made that the system PAP was correctly entered, the process passes to block 520 which depicts BIOS entering setup. A user may then modify the settings to correct the source of the error or in some manner clear the error condition which caused the boot process to fail. The network PAP bit 330 is then cleared. The client is re-booted. The process then passes to block 506.

Referring again to block 518, if a determination is made that the system PAP was not correctly entered, the process passes to block 522 which depicts a determination of whether or not the client received a copy of the network PAP. If a determination is made that the client did not receive a copy of the network PAP, the process passes to block 518.

Referring again to block 522, if a determination is made that the client did receive a copy of a network PAP, the process passes to block 524 which illustrates network adapter 230 comparing the received copy of a network PAP to the initial network PAP stored in location 332. Block 526, then, depicts a determination of whether or not the received copy is the same as the stored copy. If a determination is made that they are the same, the process passes to block 528 which illustrates network adapter 230 setting bit 330. The process then passes to block 530.

Referring again to block 526, if a determination is made that the received PAP is not the same as the stored PAP, the process passes to block 532 which illustrates network adapter 230 leaving network PAP bit 330 cleared. The process then passes to block 530 which depicts POST reading the network PAP bit 330 to determine whether it is set.

Next, block 534 illustrates a determination of whether or not bit 330 is set. If bit 330 is not set, i.e. it is clear, the process passes back to block 518. Referring again to block 534, if a determination is made that bit 330 is set, the process passes to block 520 which depicts BIOS entering setup so that the cause of the error may be corrected.

FIG. 6 depicts a high level flow chart which illustrates a server computer system transmitting a network settings password to a client computer system in accordance with the method and system of the present invention. The process starts as illustrated at block 600 and thereafter passes to block 602 which depicts the server transmitting a message to a client to enable security within the client. Next, block 604 illustrates the server transmitting an initial network PAP to the client. Thereafter, block 606 depicts the server receiving an alert about the client encountering an error during booting.

The process then passes to block 608 which illustrates the server receiving a request form the client to transmit a copy of the client's network PAP. A user may contact a help desk which would then request the server to transmit a copy of the client's network PAP. Therefore, this request may be received from the client or from another computer system on the network such as a help desk computer system. Next, block 610 depicts the server transmitting a copy of the client's network PAP to the client. The process then terminates as illustrated at block 612.

While a preferred embodiment has been particularly shown and described, it will be understood by those skilled in the art that various changes in form and detail may be made therein without departing from the spirit and scope of the present invention.

What is claimed is:

1. A data processing system for permitting a server computer to remotely provide a settings password to a client computer system, said client computer system being coupled to a server computer system utilizing a network, comprising:

said server computer system executing code for establishing a network settings password for said client computer system within said server computer system, wherein said network settings password is required prior to permitting access to system settings included within said client computer system;

a network adapter within said client computer system capable of receiving said network settings password from said server computer system utilizing said network;

said client computer system capable of permitting access to said system settings in response to said receipt of said network settings password, wherein said server computer system remotely provides said network settings password to said client computer system;

said client computer system executing code for establishing a local settings password within said client computer system, wherein either said local settings password or said network settings password is required prior to permitting access to system settings included within said client computer system;

in response to a failure to boot, said client computer system executing code for requesting said local settings password from a user;

in response to a failure of said user to correctly enter said local settings password, said client computer system executing code for requesting said network settings password from said server computer system; and said server computer system executing code for transmitting said network settings password to said client computer system utilizing said network in response to said request from said client computer system.

2. The system according to claim 1, further comprising:

said client computer system executing code for storing an initial network settings password within said client computer system prior to regular operation of said client computer system;

in response to a receipt of said network settings password from said server, said network adapter executing code for comparing said initial network settings password with said received network settings password;

in response to a determination that said initial network settings password and said received network settings password are the same, said client computer system executing code for permitting access to said system settings; and in response to a determination that said initial network settings password and said received network settings password are different, said client computer system executing code for prohibiting access to said system settings.

3. The system according to claim 2, further comprising said client computer system capable of storing said initial network settings password within non-system-accessible storage within said client computer system, said storage being inaccessible to software executing within said client computer system, wherein only said network adapter may access said initial network settings password.

4. The system according to claim 3, further comprising:
a network bit within said network adapter capable of being read by software executing within said client computer system;
in response to a determination that said initial network settings password and said received network settings password are the same, said client computer system executing code for setting said network bit; and
in response to a determination that said initial network settings password and said received network settings password are different, said client computer system executing code for clearing said network bit.

5. The system according to claim 4, further comprising in response to said network bit being set, said client computer system capable of permitting access to said system settings.

6. The system according to claim 5, further comprising in response to accessing said system settings, said client computer system executing code for clearing said network bit.

7. The system according to claim 6, further comprising in response to network bit being set, said client computer system capable of being re-booted.

8. A method in a data processing system for permitting a server computer to remotely provide a settings password to a client computer system, said client computer system being coupled to a server computer system utilizing a network, said method comprising the steps of:
establishing a network settings password for said client computer system within said sever computer system, wherein said network settings password is required prior to permitting access to system settings included within said client computer system;
said client computer system receiving said network settings password from said server computer system utilizing said network;
permitting access to said system settings in response to said receipt of said network settings password, wherein said server computer system remotely provides said network settings password to said client computer system;
establishing a local settings password within said client computer system, wherein either said local settings password or said network settings password is required prior to permitting access to system settings included within said client computer system;
in response to a failure to boot, said client computer system requesting said local settings password from a user;
in response to a failure of said user to correctly enter said local settings password, said client computer system requesting said network settings password from said server computer system;
said server computer system transmitting said network settings password to said client computer system utilizing said network in response to said request from said client computer system;
storing an initial network settings password within said client computer system prior to regular operation of said client computer system;
in response to a receipt of said network settings password from said server, a network adapter included within said client computer system comparing said initial network settings password with said received network settings password;
in response to a determination that said initial network settings password and said received network settings password are the same, permitting access to said system settings; and
in response to a determination that said initial network settings password and said received network settings password are different, prohibiting access to said system settings.

9. The method according to claim 8, further comprising the step of storing said initial network settings password within non-system-accessible storage within said client computer system, said storage being inaccessible to software executing within said client computer system, wherein only said network adapter may access said initial network settings password.

10. The method according to claim 9, further comprising the steps of:
establishing a network bit within said network adapter, said network bit being readable by software executing within said client computer system;
in response to a determination that said initial network settings password and said received network settings password are the same, setting said network bit; and
in response to a determination that said initial network settings password and said received network settings password are different, clearing said network bit.

11. The method according to claim 10, further comprising the step of in response to said network bit being set, permitting access to said system settings.

12. The method according to claim 11, further comprising in response to accessing said system settings, clearing said network bit.

13. The method according to claim 12, further comprising the step of in response to network bit being set, said client computer system re-booting.

14. A data processing system for permitting a server computer to remotely provide a settings password to a client computer system, said client computer system being coupled to a server computer system utilizing a network, comprising:
said server computer system executing code for establishing a network settings password for said client computer system within said server computer system, wherein said network settings password is required prior to permitting access to system settings included within said client computer system;
said client computer system executing code for establishing a local settings password within said client computer system, wherein either said local settings password or said network settings password is required prior to permitting access to system settings included within said client computer system;
said client computer system executing code for storing an initial network settings password within said client computer system prior to regular operation of said client computer system;
said client computer system capable of storing said initial network settings password within non-system-accessible storage within said client computer system, said storage being inaccessible to software executing within said client computer system, wherein only said network adapter may access said initial network settings password;

in response to a failure to boot, said client computer system executing code for requesting said local settings password from a user;

in response to a failure of said user to correctly enter said local settings password, said client computer system executing code for requesting said network settings password from said server computer system;

a network adapter within said client computer system capable of receiving said network settings password from said server computer system utilizing said network;

said server computer system executing code for transmitting said network settings password to said client computer system utilizing said network in response to said request from said client computer system;

in response to a receipt of said network settings password from said server, said network adapter executing code for comparing said initial network settings password with said received network settings password;

in response to a determination that said initial network settings password and said received network settings password are the same, said client computer system executing code for setting said network bit;

in response to a determination that said initial network settings password and said received network settings password are different, said client computer system executing code for clearing said network bit;

a network bit within said network adapter capable of being read by software executing within said client computer system;

in response to said network bit being set, said client computer system capable of permitting access to said system settings;

in response to accessing said system settings, said client computer system executing code for clearing said network bit; and in response to network bit being set, said client computer system capable of being re-booted.

* * * * *